(12) United States Patent
Weidinger et al.

(10) Patent No.: US 9,488,311 B2
(45) Date of Patent: Nov. 8, 2016

(54) FLEXIBLE INSULATION SYSTEM FOR HIGH TEMPERATURES

(75) Inventors: Jürgen Weidinger, Münster (DE); Christoph Zauner, Münster (DE); Mark E. Harakal, Münster (DE); Stephan Möller, Münster (DE)

(73) Assignee: Armacell Enterprise GmbH & Co., KG, Schöenefeld OT Waltersdorf (DE)

( * ) Notice: Subject to any disclaimer, the term of this patent is extended or adjusted under 35 U.S.C. 154(b) by 974 days.

(21) Appl. No.: 13/209,647

(22) Filed: Aug. 15, 2011

(65) Prior Publication Data

US 2012/0040138 A1 Feb. 16, 2012

(30) Foreign Application Priority Data

Aug. 13, 2010 (EP) .................... 10172734

(51) Int. Cl.
| | |
|---|---|
| B32B 3/26 | (2006.01) |
| B29C 47/06 | (2006.01) |
| F16L 59/14 | (2006.01) |
| B29C 47/02 | (2006.01) |
| B29C 71/02 | (2006.01) |
| B29C 47/00 | (2006.01) |
| B32B 5/18 | (2006.01) |
| B32B 25/20 | (2006.01) |
| F16L 59/02 | (2006.01) |
| F16L 59/153 | (2006.01) |
| C08L 83/04 | (2006.01) |
| F24J 2/51 | (2006.01) |
| C08G 77/20 | (2006.01) |

(52) U.S. Cl.
CPC .......... *F16L 59/143* (2013.01); *B29C 47/0064* (2013.01); *B29C 47/021* (2013.01); *B29C 71/02* (2013.01); *B32B 5/18* (2013.01); *B32B 25/20* (2013.01); *C08L 83/04* (2013.01); *F16L 59/029* (2013.01); *F16L 59/153* (2013.01); *F24J 2/515* (2013.01); *B32B 2266/08* (2013.01); *B32B 2307/306* (2013.01); *C08G 77/20* (2013.01); *Y02E 10/40* (2013.01); *Y10T 428/24504* (2015.01)

(58) Field of Classification Search
None
See application file for complete search history.

(56) References Cited

U.S. PATENT DOCUMENTS

| | | | | |
|---|---|---|---|---|
| 3,317,455 A | * | 5/1967 | Blome et al. | 523/219 |
| 4,399,319 A | | 8/1983 | Zinn | |
| 6,121,336 A | * | 9/2000 | Okoroafor et al. | 521/112 |
| 2009/0308001 A1 | * | 12/2009 | Wu et al. | 52/173.3 |

FOREIGN PATENT DOCUMENTS

| | | |
|---|---|---|
| AT | 010229 U1 | 11/2008 |
| CN | 2413139 Y | 1/2001 |
| DE | 63240 A | 8/1968 |
| DE | 2813824 A1 | 10/1979 |

(Continued)

*Primary Examiner* — Chinessa Adkins
(74) *Attorney, Agent, or Firm* — Rothwell, Figg, Ernst & Manbeck, P.C.

(57) ABSTRACT

The present invention relates to a thermal and/or sound insulation system with resistance to elevated temperatures comprising at least one layer of a chemically expanded and crosslinked high consistency (HCR) polysiloxane polymer blend, the process for manufacturing of such system and the use of such system.

16 Claims, 3 Drawing Sheets

(56) References Cited

FOREIGN PATENT DOCUMENTS

| | | |
|---|---|---|
| DE | 29617936 U1 | 1/1997 |
| DE | 19926850 A1 | 8/2000 |
| DE | 20009556 U1 | 10/2000 |
| EP | 892207 A2 | 1/1999 |
| EP | 0974784 A1 | 1/2000 |
| EP | 1113234 A2 | 7/2001 |
| EP | 1213527 A2 | 6/2002 |
| EP | 1239205 A2 | 9/2002 |
| EP | 1279883 A2 | 1/2003 |
| EP | 2189494 A1 * | 5/2010 ............ B29C 47/00 |
| WO | 2008/151771 A2 | 12/2008 |

* cited by examiner

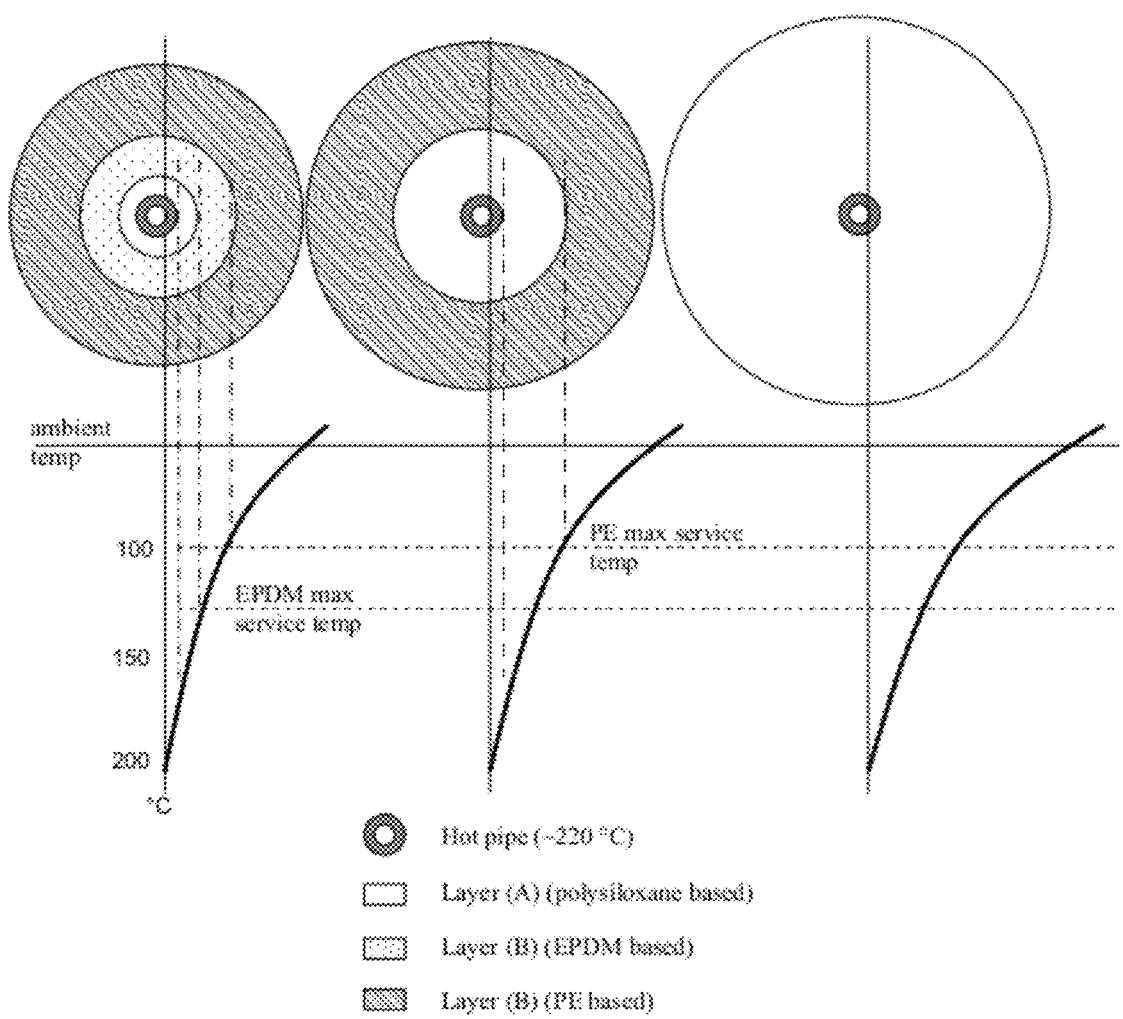

FLEXIBLE INSULATION SYSTEM FOR HIGH TEMPERATURES

CROSS REFERENCE TO RELATED APPLICATIONS

This application claims priority from European patent application No. 10172734.5 filed on Aug. 13, 2010, all of which is incorporated herein by reference in its entirety for all purposes.

The present invention relates to a thermal and/or sound insulation system with resistance to elevated temperatures, the process for manufacturing of such system and the use of such system.

Insulation systems for shielding high temperatures are dominated by mostly inorganic materials (glass or mineral fibre like Isover® or Rockwool®, foamed glass like Foamglas®, silica, silica gels like Aerogel® etc.) or rigid cross-linked expanded resins (PIR/PUR like Puren®, thermosets, such as melamine, like Basotec®, or phenolics). All those systems lack easy mounting and demounting properties and show limits both when it comes to efficiently insulating bows, flanges etc., and of course can scarcely be offered as pre-insulation, e.g. on corrugated pipe. Furthermore fibrous materials and open-cell, rigid expanded resins have a high gas and water vapour transmission. This can e.g. cause condensation on the pipes which leads to corrosion. Foamed glass is not flexible and therefore the installation is quite elaborate and expensive. Due to this, foamed glass does not withstand vibrations, expansion/contraction cycles etc., limiting its fields of applications.

One of the major drivers for works in the field of more flexible high temperature insulation solutions definitely is the solar industry, especially since evacuated tube collectors showed up in the market, as their connected piping system may reach temperatures higher than 200° C. The majority of proposals for flexible high temp insulation bases on the use of a non-degradable or at least very temperature inert inner layer, such as in DE 19926850, EP 1239205 or in some applications in use (e.g. Trocellen Solar Sleeves, Würth Edelstahlwellrohr Solar, WIP-FLEX-TWIN® "V" etc.). However, all those solutions again have to rely on inner layers of the well-known inorganic kind and therefore show no significant improvement of the a.m. disadvantages of such materials.

A preferred material in the industry for insulating standard solar systems working with flat collectors or heat exchanging connections in general is EPDM rubber, mainly as expanded foam, such as in U.S. Pat. No. 4,399,319, EP 1113234 and EP 1213527. In connection with other materials EPDM is used in EP 1279883 and AT 010229U1 (EPDM in PE foam bedding), EP 1239205 (EPDM foam on textile protection layer), DE 29617936 and DE 20009556 (pre-insulated tubes—EPDM—in an envelope) and in some applications in use, such as Armaflex® DuoSolar or Kaiflex® Solar EPDM. However, EPDM is known to show heat degradation by oxidation already at 150° C. and lower, depending on the EPDM compound, which means that even for standard collectors the material is at its limits already, thus, not a solution even when being used on a protective layer.

PUR and PIR are even used for thermal insulation like in EP 892207 and in combinations, e.g. with silicone, like in DD 63240, which, however, still have the above mentioned disadvantages and/or do not withstand the required temperatures.

In general, thermoplastic foams are used for thermal insulation at lower (<100° C.) temperatures. To slightly improve the thermal resistance cross-linked PE is used, like in CN 2413139 or some applications in use, like Trocellen Solar Sleeves, but these materials do even not resist the temperatures of evacuated tube collectors.

Materials being able to bear some higher thermal energy load have been mentioned in DE 19926850 (silicone foam or textile, but even PE foam), EP 974784 (non-polar elastomers, like EPDM or silicone) EP 2171358 (silicone, polyamide, but even EPDM) and in some solutions in the industry (Ayvaz/TK solid silicone protection layer, followed by EPDM foam). Furthermore polymer fibres like polyamide or polyester are used for higher temperature applications, as in DE 2813824 or in some applications in use, like WIP-FLEX-TWIN® "V". These fibrous polymer insulation materials have the same disadvantages as the already mentioned fibrous materials.

Of course EPDM and/or PE would not make sense as high temp insulation, and high temperature PA again is rigid material. Silicone elastomer is known for being among the best high temperature resistant flexible materials. However, it has to be stated that only high consistency silicone rubber (HCR or HTV) is able to bear high temperature loads sufficiently without showing stiffening or reversion, as HCR polymers (polysiloxanes) are significantly longer and thus more stable than those of liquid rubber (LSR) or other silicone varieties (RTV etc.). Additionally, HCR is a classic rubber polymer that can be filled, stabilized etc. and therefore be suitable in principle for the intended use. However, for the existing and predicted temperatures both in industrial insulation and in solar applications the heat resistance of HCR is at its limit either, as tube collectors run at 220° C. with peaks of more than 250° C., and forecasts for solar collectors are for 300° C.: brochures and websites of silicone suppliers do not recommend to use silicone for more than four weeks under these conditions.

Another disadvantage is the fact that HCR can only be expanded to high to medium densities (current catalogues of suppliers offer a density down to ~300 kg/m3 for HCR silicone foam, whereas solid silicones are offered at 1100 to 1400 kg/m3). As the density is both important for the thermal insulation (less than 150 kg/m3 are at least required to achieve thermal conductivities <0.050 W/mK that would qualify the foam as insulation material according to international agreements), the weight of the system and the economics (silicone is notorious for high raw material costs) this is another prominent challenge to overcome. Additionally, industrial insulation (e.g. heating lines for chemical reactors etc.) will reach temperatures even higher than 300° C.; therefore, existing solutions can not fulfil the respective requirements.

A major object of the present invention thus is to provide a system or material not showing the above mentioned deficiencies but exhibiting outstanding thermal resistance of the insulation together with low density and good flexibility.

Surprisingly, it is found that such system or material not showing the above mentioned disadvantages can be made as a multilayer composite comprising specially adapted low density polysiloxane blend with an optional surface structure in combination with other layers.

In the drawings, which form a part of this specification,

FIG. 4 is a cross-sectional schematic drawing of the claimed thermal and/or sound insulation material and a chart of the corresponding thermal gradients.

Figure 1:
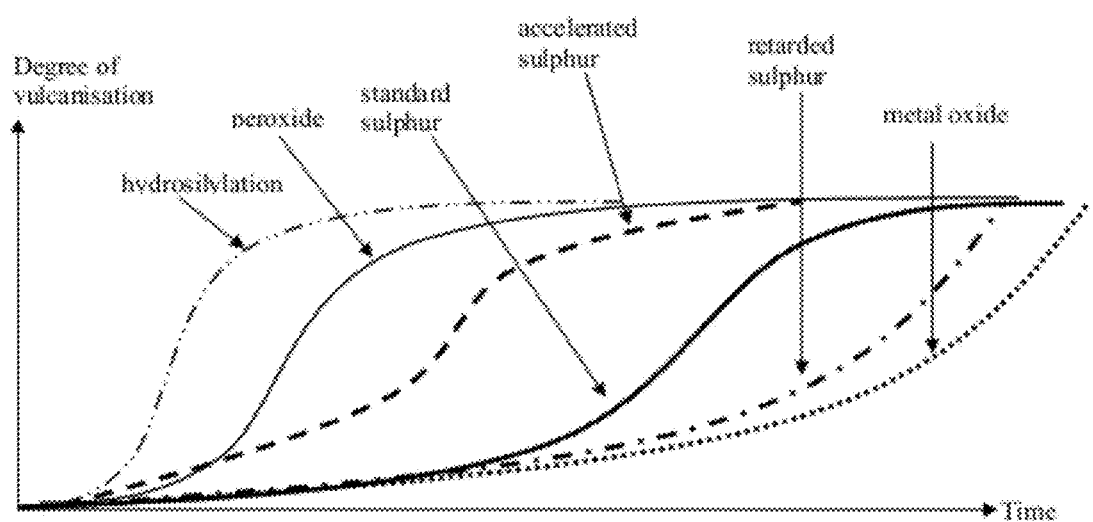
FIG. 1 is a chart of the degree of vulcanisation over time for different crosslinking methods.

The claimed material comprises at least one layer (A), comprising an expanded and crosslinked polysiloxane polymer blend. The polysiloxane polymers (at least one) of the polysiloxane blend preferably have a content of functional groups (vinyl content) of at least 1%, especially preferred more than 2.5%. The high content of vinyl groups will lead to a high crosslinking density after vulcanisation which as a consequence will create a thermally stable network. Additionally, the high vinyl content will render the polysiloxane accessible to all kinds of crosslinking methods, such as by peroxides, through hydrosilylation by support of catalysts, by radiation, by classic sulphur compound based vulcanisation, by metal oxides etc. Preferred are hydrosilylation (as vulcanisates achieved by hydrosilylation show good thermal stability) or sulphur and/or metal oxide based crosslinking. Especially preferred is sulphur compound based and/or metal oxide based crosslinking: it is economic and will allow obtaining very low density foams as both lead to a smooth and relatively slow vulcanisation reaction compared to other methods (see FIG. 1) and therefore will facilitate expansion leading to lowest possible densities. The polymer base of the polysiloxane blend may comprise polysiloxanes carrying side and/or terminal groups/substituents such as alkyl, like methyl, ethyl etc.; alkenyl, like vinyl etc; aryl, like phenyl; halogenated, like trifluoropropyl; hetero substituted groups containing e.g. oxygen, sulphur, nitrogen, phosphorous; or any mixed compositions thereof.

The polysiloxane blend furthermore comprises at least one expansion agent chosen from the classes of chemicals releasing carbon dioxide, nitrogen, oxygen or water. Preferred are chemicals releasing nitrogen, especially preferred are azo compounds. The polysiloxane blend is expanded to a mainly closed cell foam with a closed cell content of at least 80% and to a density of less than 350 kg/m3, preferably less than 150 kg/m3, to lower the thermal conductivity to less than 0.051 W/mK at 0° C.

The polysiloxane blend furthermore comprises one or more fillers chosen from the classes of metal and half metal oxides or hydroxides, carbon blacks, carbonates, and sulphates. Preferred are silicon containing fillers, especially preferred are all types of silica. The polysiloxane blend furthermore comprises a heat and/or reversion stabilizer system. The stabilizers can be chosen from the classes of carbon blacks, metal oxides (e.g. iron oxide) and hydroxides (e.g. magnesium hydroxide), metal organic complexes, radical scavengers (e.g. tocopherol derivates), complex silicates (e.g. perlite, vermiculite), and combinations thereof.

The polysiloxane blend furthermore may comprise all kinds of other fillers or additives, such as other elastomers, thermoplastic elastomers and/or thermoplastics and/or thermoset based polymer mixtures, or combinations thereof, or as recycled material, other recycled polymer based materials, fibres etc. Preferred are fillers or additives supporting the heat resistance of the blend either by direct stabilization and/or by synergistic effects with the heat stabilizing system, such as carbon black, iron oxide, e.g. magnetite, vermiculite, perlite, etc., or mixtures thereof.

The polysiloxane blend may comprise further additives such as flame retardants, biocides, plasticizers, stabilizers, colours etc., of any kind in any ratio, including additives for improving its manufacturing, application, aspect and performance properties, such as inhibitors, retarders, accelerators, etc.; and/or additives for adapting it to the applications' needs, such as char-forming and/or intumescent additives, like expanding graphite, to render the material self-intumescent in case of fire to close and protect e.g. wall and bulkhead penetrations; and/or substances that will lead to a self-ceramifying effect to pipes, wall penetrations etc. in case of fire, such as boron compounds, silicon containing compounds etc.; and/or internal adhesion promoters to ensure self-adhesive properties in co-extrusion and co-lamination applications, such as silicate esters, functional silanes, polyols, etc.

Figure 2:
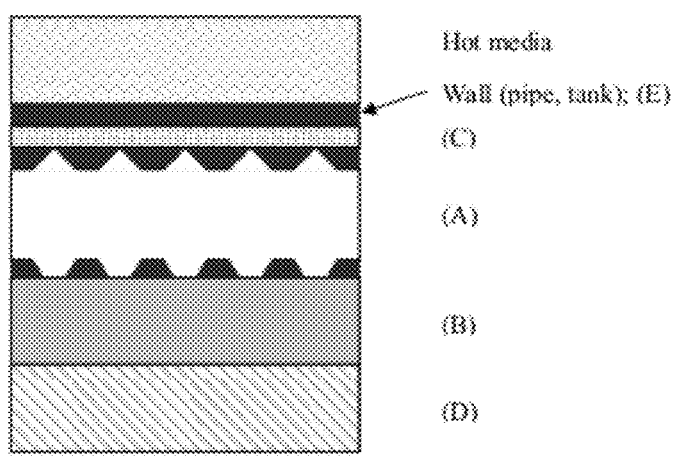
FIG. 2 is a schematic drawing of the claimed thermal and/or sound insulation material.

Layer (A) may show a ridge-like surface structure on one or both of its sides to act as a spacer for limiting heat transmission and for decoupling from sound (see FIG. 2). The ridge-like structure may be of sinus like shape, or rectangular, or triangular, or trapezoidal, or a combination thereof.

Figure 3:
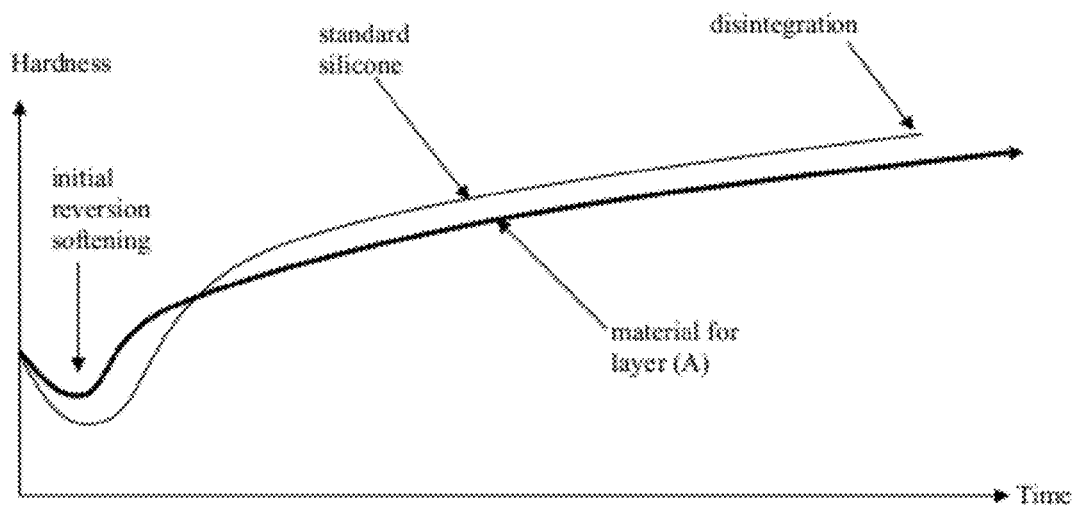
FIG. 3 is a chart of the hardness over time for standard silicone and the claimed material.

Layer (A) will resist temperatures up to 300° C. without showing severe hardening or decomposition. At higher temperatures standard polysiloxane based materials will become brittle and their foam would disintegrate. The preferred composition of (A), however, will indeed show a faster initial hardening by oxidative aging than standard compounds, however, the aging will 1) slow down over time and 2) will eventually lead to a rigid, but not brittle foam maintaining its insulation properties (FIG. 3, table 3). This is due to the sulphur crosslinking leading to (poly)sulphur bridged polymer networks. When being oxidized by high heat aging those bridges will partially be opened (by oxygen radicals from air) and recombined, and subsequently will of course shorten but not completely break down as it would be the case with short carbon bridging at standard silicones. The sulphur crosslinking, mostly known for being less stable versus "medium high" heat thus shows benefits at very high heat load. The preferred fillers will support this effect as they will stabilize sulphur radicals and absorb oxygen radicals, and can offer sites for bonding sulphur bridges to the filler particles rendering the whole blend even more stable and preventing brittleness.

The claimed material may comprise at least one layer (B), comprising an expanded polymer blend and which shows at least 80% closed cell content at a density of less than 150 kg/m3, preferably less than 80 kg/m3, and a thermal conductivity of not more than 0.040 W/mK at 0° C. Layer (B) can be used to improve both the thermal insulation properties of the entire system and the economics, as the polymer material for (B) can be chosen from cheaper raw material sources, such as EPDM, other organic rubbers such as CR, EPM, IR, IIR, NR, NBR, SBR; and/or polyolefins, such as PE, crosslinked PE etc., because of the lower temperatures to be handled.

(B) may be connected to (A) by mechanical means, by chemical adhesion or by direct connection during manufacturing, e.g. by co-extruding, co-moulding and/or lamination. Care has to be taken that the connecting layer or interface is sufficiently heat resistant. Depending on the interface temperature adhesives such as one or two part silicone, polyurethane, acrylate, chloroprene, contact adhesives or hot melts or any combination thereof can be applied. The choice of polymer base for (B) depends on the interface temperature as well, which itself is depending on the character and thickness of at least layer (A), or of layer (A) and (C), if applied (see FIG. 4, table 2 and 3): e.g. EPDM can be safely applied as layer (B) at an interface temperature of less than 150° C., whereas polyethylene may only be applied at temperatures lower than 100° C.

The claimed material may comprise at least one layer (C) which can be applied as a protective layer between the hot surface and layer (A), see FIG. 2. Layer (C) is only required for surface temperatures higher than 300° C. if hardening of layer (A) is not desired. Layer (C) may comprise temperature invariant materials, such as foamed glass, micro and nano scale inorganic particles in a matrix (e.g. Aerogel®); fibres of glass, mineral/ceramics, carbon, amide, aramide, imide or polyester, organic fibres such as wool, hemp sisal, etc.; as tissue, woven or nonwoven; as chopped fibre, short or long fibre, with or without binder, in a matrix; or any combination thereof.

The claimed material furthermore may comprise additional layers (D) providing additional insulation or diffusion barrier or protection properties, or a combination thereof. Layers (D) may be applied underneath or on top of layers (A)-(C) or within the layers (A)-(C). Layers (D) can preferably be applied on the outer surface of the system for protection purposes, e.g. against weathering, UV, or mechanical impact.

The claimed material furthermore may comprise additional parts (E), see FIG. 2, not being insulation material, e.g. plastics or metal work like pipes or tubes, such as corrugated metal pipe, that can be directly be co-extruded on by the system (A)-(C)/(D) or that can be inserted into the insulation part after its manufacturing, to form a pre-insulated system.

The claimed material furthermore may comprise a combination (F) of two or more pipes or tubes comprising at least (A) and (E), preferably (A), (B) and (E); or (A)-(C) and (E); or (A)-(E). The combination (F) can be embedded in a common matrix, such as another foam, or can be wrapped by a cladding, or the like, or can consist of at least two pre-insulated pipes that are connected permanently or that can be separated from each other, e.g. by connecting them temporarily with an appropriate adhesive. (F) can also comprise additional parts like wires, tubes, links etc., that are required by the intended application, such as control lines for solar pipe work.

It is a prominent advantage of the claimed material that it is providing reliable and sustainable thermal insulation at temperatures raising up to 450° C. when being applied as a (C)/(A)/(X) system and at least up to 300° C. when applied as (A)/(X) system.

Another basic advantage of the claimed material is the fact that it is flexible and easy in mounting and demounting, even when it comes to insulation elbows, valves, flanges etc.

It is another important advantage of the claimed material that its insulation properties are very constant over a wide temperature range.

It is another advantage of the claimed material that it is not only high temperature stable but also low temperature flexible, as the glass transition temperature of polysiloxanes is below −100° C.

It is a further advantage of the claimed material that its composition will allow to use it indoors as well as outdoors, as weathering and UV stability is provided, as well as non toxic composition, and no odour being formed.

It is a resulting advantage of the claimed material that it is environmental friendly itself as it does not comprise or release harmful substances, does not affect water or soil and as it can be blended or filled with or can contain scrapped or recycled material of the same kind to a very high extent not losing relevant properties significantly.

A further advantage of the claimed material is that phthalates are not needed as plasticizers, nor PVC or other halogenated materials as ingredient which are partially under discussion and partially prohibited already for the same reason.

A further advantage of the claimed material is the possibility to adapt its properties to the desired property profile (concerning insulation, mechanical resistance etc.) by expanding it to an appropriate foam cell structure or density or by applying appropriate layer combinations.

It is a prominent advantage of the claimed material that it can be produced in an economic way in a one-step mixing and a one-step shaping process, e.g. by moulding, extrusion and other shaping methods. It shows versatility in possibilities of manufacturing and application. It can be extruded, co-extruded, laminated, moulded, co-moulded etc. as single item or multilayer and thus it can be applied in unrestricted shaping.

It is a further advantage of the claimed material that it can be transformed and given shape by standard methods being widespread in the industry and that it does not require specialized equipment.

A further advantage of the claimed material is the fact that it is easily colourable, e.g. in red to indicate heat.

It is a further prominent advantage of the claimed material that it is providing built-in acoustic damping properties, especially when the hardening effect described for (A) is not used: the flexible material will absorb sound by viscous dispersion into the matrix which is neither provided by rigid nor non-cellular systems.

A further advantage of the use of the claimed material for applications requiring high temperature resistance at application temperatures >200° C. or >300° C., respectively, such as for thermal solar pipe and tank insulation, industrial thermal and/or acoustic insulation, e.g. for high temp fluid pipe and tank or reactor insulation, for indoor and/or outdoor purposes.

Density was tested by ISO 845; LOI by ISO 4589; thermal conductivity by EN 12667; flammability classification in accordance with EN 13501/EN 13823.

EXAMPLES

For the following examples sheet of 19 mm thickness and 30 cm width and tube of 19 mm thickness and various inner diameter had been produced by extruding, expanding and crosslinking a respective rubber compound:

Layer (A): Armaprene® UHT, polysiloxane based, tube: 25 mm inner diameter;

Layer (B'): Armaprene® HT, EPDM based, tube: 63 mm inner diameter;

both Armacell GmbH, Münster, Germany.

For polyethylene insulation for layer (B") respective material had been extruded and expanded by physical foaming (Tubolit®, Armacell sro, Sroda Slaska, Poland). The respective materials were also used as benchmarks as stand alone layers.

Example 1

Insulation Properties

Density was tested by ISO 845; LOI by ISO 4589; thermal conductivity by EN 12667; flammability classification in accordance with EN 13501/EN 13823. For multilayer systems a thickness of 19 mm each was chosen.

TABLE 1

Physical properties

|  | (A)* | (B') | (B") | (A)/(B')* | (A)/(B')/(B")* | (A)/(B")* |
|---|---|---|---|---|---|---|
| Density [kg/m3] | 83 | 82 | 35 | — | — | — |
| LOI | 40 | 32 | 26 | 36 | 33 | 29 |
| Thermal Conductivity at 0° C. [W/mK] | 0.044 | 0.039 | 0.036 | — | — | — |
| Flammability classification | C S1 d0 | D S3 d0 | D/E S1 d1 | D S2 d0 | D S1 d0 | D S1 d0 |

*innovative example

Example 2

Cyclic Heat Aging

Tube material of 19 mm thickness and 1 m length was mounted on a stainless steel pipe of 1" (2.54 cm) diameter, either as stand alone system or in combinations with other materials. The pipe was heated up to 300° C. by thermal oil and left at that temperature for 18 h. After let cool down to ambient temperature the same cycle was applied. This was repeated 60 times in total. The material therefore was loaded for 1000 hours with 300° C., or for ~1300 hours with more than 200° C., respectively.

TABLE 2

Properties after cyclic heat aging

| | Innovative example | Comparative example | Degree of stiffening | Brittleness | Cell structure |
|---|---|---|---|---|---|
| (A) | X | | low | no | maintained |
| (B') | | X | high | very high | 60% maintained |
| (B") | | X | melt away | melt away | 100% destroyed |
| (A)/(B') | X | | (A): low (B'): low | (A): no (B'): low | (A): maintained (B'): maintained |
| (A)/(B')/(B") | X | | (A): low (B'): low (B"): no | (A): no (B'): low (B"): no | (A): maintained (B'): maintained (B"): maintained |
| PEX* | | X | decomposition | high | 80% destroyed |
| Q** | | X | medium | medium | 90% maintained |

*PEX: crosslinked polyethylene, ¾" (19.1 mm) thickness (OleTex ®, Armacell LLC, South Holland, U.S.A.)
**Q: standard silicone foam, 20 mm thickness, density 300 kg/m³ (MagniCell ® LEV 250, MTI Leewood, Bremen, Germany).

Example 3

Static High Heat Aging

Flat sheet samples of ~19 mm thickness were measured for their exact thickness and then placed on a Mettler lab heating plate and compressed by an iron weight to achieve approximately 10% compression (2 mm) as applied in real mounting. The plate was heated up to 400° C. for 500 hours. The iron weight was removed after let cooling down and the remaining deformation was measured (100%=full 2 mm remaining deformation).

TABLE 3

Properties after static heat aging

| | Innov. example | Comp. example | Degree of stiffening | Brittleness | Cell structure | Remaining deformation |
|---|---|---|---|---|---|---|
| (A) | X | | high | low | maintained | 40% |
| (B') | | X | decomposition | pulverized | 100% destroyed | >100% |
| (B") | | X | melt away | melt away | 100% destroyed | >100% |
| (A)/(B') | X | | (A): high (B'): medium | (A): low (B'): low | (A): maintained (B'): maintained | (A): 40% (B'): 40% |
| (A)/(B')/(B") | X | | (A): high (B'): low (B"): no | (A): low (B'): low (B"): no | (A): maintained (B'): maintained (B"): maintained | (A): 40% (B'): 30% (B"): 20% |
| PEX* | | X | decomposition | decomposed | 100% destroyed | >100% |
| Q** | | X | high | high | 80% destroyed | 100% |

*PEX: crosslinked polyethylene, ¾" (19.1 mm) thickness (OleTex ®, Armacell LLC, South Holland, U.S.A.)
**Q: standard silicone foam, 20 mm thickness, density 300 kg/m³ (MagniCell ® LEV 250, MTI Leewood, Bremen, Germany).

We claim:

1. A material comprising at least one of a thermal or sound insulation material comprising at least one layer of a chemically expanded and crosslinked high consistency (HCR) polysiloxane polymer blend and where crosslinking is achieved by at least one of hydrosilylation, peroxides, sulphur compounds or metal oxides and wherein the polysiloxane blend is expanded to a closed cell content of at least 80% and to a density of less than 350 kg/m3 according to ISO 845 and the expanded and crosslinked polysiloxane blend is showing a thermal conductivity of less than 0.15 W/mK at 0° C. according to EN 12667.

2. The material according to claim 1 which comprises at least one of a heat or reversion stabilizing system.

3. The material according to claim 1 wherein the material shows ridge structures on one or both surfaces of the layer.

4. The material according to claim 1 wherein the material comprises at least one protective layer on the interior to prevent at least one of heat or mechanical damage.

5. The material according to claim 1 wherein the material comprises at least one additional insulation layer on the exterior to improve insulation properties, heat resistance, and to lower costs.

6. The material according to claim 5 wherein the at least one additional insulation layer comprises an expanded ethylene-propylene or ethylene-propylene-diene polymer acting as insulation and heat resistant layer showing at least 80% closed cell content at a density of less than 150 kg/m3, and a thermal conductivity of not more than 0.040 W/mK at 0° C.

7. The material of claim 6 wherein density is less than 80 kg/m3.

8. The material according to claim 1 wherein the material comprises additional layers for protection, barrier and shielding purposes at least one of on, or under and/or in within other layers.

9. The material according to claim 1 wherein pipes or tubes of plastics, metal are covered by the insulation layers to form pre-insulated parts.

10. The material of claim 1 wherein the polysiloxane polymers of the polysiloxane blend then have vinyl content of at least 1%.

11. The material of claim 10 wherein the polysiloxane polymers of the polysiloxane blend have a vinyl content of more than 2.5%.

12. The material of claim 1 wherein crosslinking is sulfur based or metal oxide based.

13. The material of claim 1 wherein density is less than 150 kg/m3.

14. The material of claim 1 wherein conductivity is less than 0.051 W/mK at 0° C.

15. A process for manufacturing the material according to claim 1 in a moulding or continuous at least one of (co) extrusion or lamination process.

16. A process for manufacturing the material according to claim 9 in a continuous process.

* * * * *